Jan. 4, 1955
E. L. McCARTHY
2,698,555
OPTICAL SYSTEM WITH CORRECTED SECONDARY SPECTRUM
Filed March 19, 1949
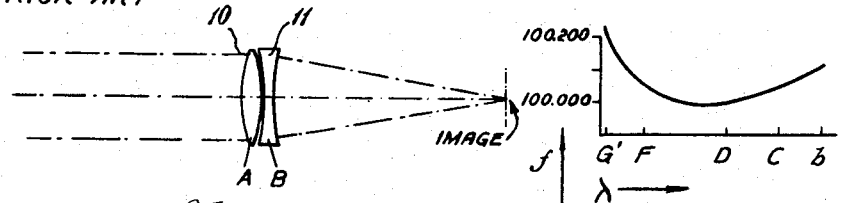
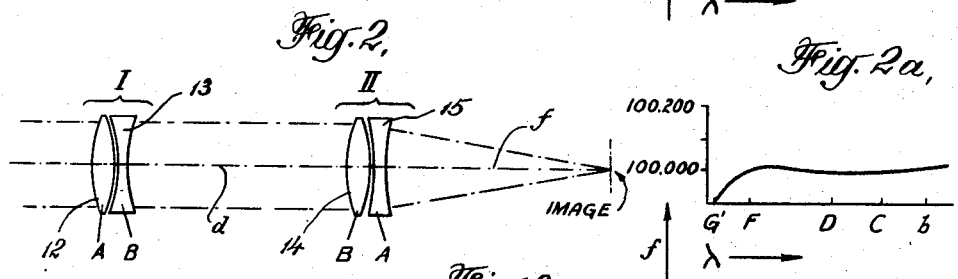
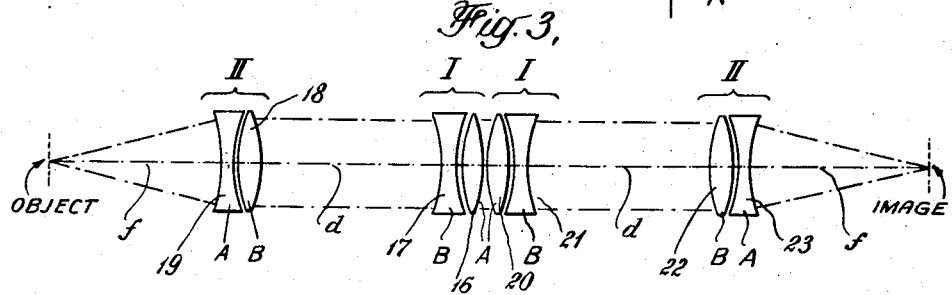
*Fig. 4.*
| λ | INDEX, n | |
|---|---|---|
|  | GLASS A | GLASS B |
| b | 1.51367 | 1.61270 |
| C | 1.51509 | 1.61546 |
| D | 1.51749 | 1.62031 |
| F | 1.52316 | 1.63258 |
| G' | 1.52767 | 1.64298 |
*Fig. 5.*
FOR WAVELENGTH $D$, $f=100$, $d=100$,
THEN $f_{A,I} = +23.0238$
$f_{B,I} = -23.0238$
$f_{B,II} = +33.9613$
$f_{A,II} = -51.4263$
IN FIGURES 2 AND 3.
INVENTOR
Edward L. McCarthy
BY
Pennie Edmonds Morton & Barrows
ATTORNEYS

United States Patent Office 2,698,555
Patented Jan. 4, 1955

2,698,555

OPTICAL SYSTEM WITH CORRECTED SECONDARY SPECTRUM

Edward L. McCarthy, Glenbrook, Conn., assignor to The Perkin-Elmer Corporation, Glenbrook, Conn., a corporation of New York Application March 19, 1949, Serial No. 82,338

2 Claims. (Cl. 88—57)

This invention relates to optical systems suitable for use in various applications, such as telescopes, range finders, periscopes, etc., and is concerned more particularly with a novel system, which is characterized by substantially reduced and, in some cases, complete elimination of secondary spectrum. In the new system, these results can be obtained by the use of only two different optical materials, which may be glass of conventional types, and without employing crystals, such as fluorite.

Ordinary optical systems have heretofore been made achromatic by the use of a combination of elements of flint and crown glass and, in such a system, the two wavelengths for which the system is achromatized have the same foci, while all other wavelengths have other foci. The departure from the ideal condition, in which all wavelengths come to a common focus, is secondary spectrum, the presence of which causes the image of a point to be surrounded with a colored halo.

I have discovered that an optical system containing ordinary optical materials of at least two kinds can be substantially freed of secondary spectrum by constructing it of two components, one of which has chromatic over-correction and the other of which has chromatic under-correction and is placed at a distance from the first component. In the new system, the over-correction of the first component is balanced by the under-correction of the second to correct the system for primary color and a choice of the proper separation between the components then results in a significant reduction and even complete elimination or over-correction of secondary spectrum. Although the over-corrected component may have either zero, positive, or negative power at the mean wavelength, the power of this component is preferably substantially zero and the greater part of the power of the system is contributed by the under-corrected component.

For a better understanding of the invention, reference may be made to the accompanying drawings, in which Fig. 1 is a diagrammatic illustration of a conventional achromatic doublet made of ordinary types of glass;

Fig. 1a is the calculated color curve of the doublet of Fig. 1;

Fig. 2 is a diagrammatic illustration of one form of the system of the invention;

Fig. 2a is the calculated color curve for the system of Fig. 2;

Fig. 3 is a diagrammatic illustration of a transfer system constructed in accordance with the invention;

Fig. 4 is a table showing the characteristics of the glass types employed in the systems of Figs. 1–3, inc.; and Fig. 5 is a table of the focal lengths of the elements in the systems of Figs. 2 and 3.

The standard achromatized doublet, shown in Fig. 1, comprises a convergent element 10 made of crown glass of type A and a divergent element 11 of flint glass of type B. By reference to the curve in Fig. 1a, it will be apparent that the use of the two different glasses in the doublet causes the light of the C and F wavelengths to be brought to a common focus. The difference in focus between the common focus of the C and F light and the focus for the D light is a measure of the secondary spectrum of the doublet.

The indices of the glasses of types A and B for different wavelengths are given in the following table and the dispersions of the glasses may be calculated therefrom in the usual way.

[Index, n.]

| λ | Glass A | Glass B |
|---|---------|---------|
| b | 1.51367 | 1.61270 |
| C | 1.51509 | 1.61546 |
| D | 1.51749 | 1.62031 |
| F | 1.52316 | 1.63258 |
| G' | 1.52767 | 1.64298 |

The system of the invention illustrated in Fig. 2 includes a component I of substantially zero power for the mean wavelength, which consists of a convergent element 12 of crown glass of type A and a divergent element 13 of flint glass of type B. The system includes a second component II, which provides the useful power of the system and consists of a convergent element 14 of flint glass of type B and a divergent element 15 of crown glass of type A. In the system of Fig. 2, component I lies in front of component II a distance $d$ which, in the particular case illustrated, is equal to the focal length $f$ of component II. Component I is chromatically over-corrected and component II is chromatically under-corrected and the over-correction and the under-correction of the components balance one another at the separation $d$, so that primary color is eliminated.

The curve of Fig. 2a shows that, although only two types of glass are used in the system of Fig. 2 and these glasses are the same as those used in the doublet of Fig. 1, the C, F, and D light has been brought in the Fig. 2 system to the same focus, so that secondary spectrum has been completely eliminated. The light of b wavelength has also been brought approximately to the common focus, and the focus for G' light has been improved.

In the system of Fig. 2, component II is shown as consisting of two elements, but it could be a single element of proper dispersion. For the case illustrated, a single element would have to have a V value of about 19.6. The elimination of secondary spectrum in the system of Fig. 2 in accordance with the principle set forth is not restricted to the use of specific glass types A and B, of which the characteristics are given, and any two or more types of glass differing in dispersion will give a theoretical solution. Also, the system may include anomalous glass types or anomalous optical materials, such as fluorite, if desired. The utility of the invention is not limited to bringing the light of the C, D, and F wavelengths to the common focus and the system may be achromatized for any desired trio of wavelengths, the C-F achromatization being conventional for visual instruments.

The system of Fig. 3 may be employed as a 1:1 transfer system useful as an erector system in a periscope or similar device and it is made up of two like groups, each of the type shown in Fig. 2. In the Fig. 3 system, the forward group comprises a component I made up of a convergent element 16 of glass type A and a divergent element 17 of glass type B. Component II of the front group comprises a convergent element 18 of glass type B and a divergent element 19 of glass type A. In the system illustrated, component II of the forward group lies at the focal distance $f$ from the object plane, and component I is separated from group II by a distance $d$, which is equal to $f$.

The rear group of the system of Fig. 3 comprises a component I consisting of a convergent element 20 of glass type A and a divergent element 21 of glass type B. The rear group also includes a component II consisting of a convergent element 22 of glass type B followed by a divergent element 23 of glass type A. In the rear half of the system, component II is separated from component I by the same distance $d$ as separates the two components in the forward half of the system, the distance $d$ being equal to the focal length $f$ of the component II. As the space between components I is traversed by parallel rays, the length of the space is not critical.

In the Fig. 3 system, component I in each group is over-corrected and component II in that group is under-corrected, the over-correction and under-correction balancing at the separation between the components to correct for primary color. Also, in the system, the components I are identical and of substantially zero net power, so that the useful power of the system is contributed by components II, which are identical. Lateral color is thus absent because of symmetry.

The focal lengths of the elements designated A and B in the components I and II in the systems shown in Figs. 2 and 3 are given in the following table.

For wavelength D and with $f=100=d$, $$f_{A,I}=+23.0238$$
$$f_{B,I}=-23.0238$$
$$f_{B,II}=+33.9613$$
$$f_{A,II}=-51.4263$$

In a system in accordance with the invention, in which the chromatically over-corrected component I is of substantially zero net power, the separation between component I and component II may be determined by calculation, as follows. According to custom, the power $\phi$ of a component is the reciprocal of its focal length $f$; the reciprocal dispersion $V$ of a component is expressed by the equation $$V=\frac{\phi_D}{\phi_F-\phi_C} \quad (1)$$

and the relative partial dispersion P of a component is defined by the equation $$P=\frac{\phi_F-\phi_D}{\phi_F-\phi_C} \quad (2)$$

In the system of the invention, light of wavelengths C, D, and F will focus at the same point when the distance $d$ between the components I and II has a value determined by the equation $$d=\frac{(P_I-P_{II})}{(_F\phi_I-_C\phi_I)[P_I-(P_I 1)]} \quad (3)$$

and also satisfies the relation expressed by the equation $$_Df_{II}=\frac{(cf_I-d)(_Ff_I-d)}{V_{II}(_Ff_I-cf_I)} \quad (4)$$

In the equations, the terms with the subscript I refer to component I and those with the subscript II refer to component II. The subscripts C, D, and F refer to light of wavelengths C, D, and F, respectively, which may be any trio of wavelengths, of which F is shorter than D and D is shorter than C. Equation 4 expresses a condition necessary for elimination of primary color, and Equation 3 expresses a condition necessary for elimination of secondary color. Decreasing or increasing the value of $d$, that is, giving $d$ a value greater or less than that determined by Equation 3, will result in either under-correction or over-correction for secondary color. The equations are based on the assumption that the object lies at an infinite distance to the left of component I, and the necessary transformations to make them applicable for other object distances are well known.

When the system of the invention is put to practical use, the spacing between the over-corrected and under-corrected components is usually fixed by other requirements of the situation and the variable is the degree of chromatic over-and-under-correction necessary to remove the secondary color. When the over-corrected component is of zero power, the variable can be evaluated by the equation. Considerable departures from zero net power for the over-corrected component may be desirable under some conditions, but the elimination of secondary spectrum in such cases involves use of the same principles as in a system, in which the over-corrected component is of zero power. Other things being equal, the degree of over- and-under correction determines how much of the secondary spectrum will be removed. Under some conditions, it may be desirable to overdo the effect to compensate other optical parts associated with the system and this can be accomplished by increasing the spacing of the two components of the system beyond that required for elimination of secondary spectrum, or by increasing the over-correction of component I, with a corresponding increase in the under-correction of component II.

As used herein, the term "in front of" is intended to mean on the side toward the object.

I claim:

1. An optical system for use with light consisting of at least three wavelengths and characterized by substantially reduced secondary spectrum, which comprises a component having substantially zero net power for the mean wavelength and chromatic over-correction and a second component having substantial net positive power and chromatic under-correction equal in amount to the over-correction of the first component, the first component being spaced in front of the second component a distance substantially equal to the focal length of the second component.

2. An optical system for use with light consisting of at least three wavelengths and characterized by substantially reduced secondary spectrum, which comprises two substantially identical groups of components in axial alignment, each group consisting of a component of substantially zero net power for the mean wavelength and chromatic over-correction and a second component having substantial net positive power and chromatic under-correction balancing the over-correction of the first component, the first component in each group being spaced from the second component a distance substantially equal to the focal length of the second component and the groups being disposed with their components of substantially zero power lying between the other components.

References Cited in the file of this patent

UNITED STATES PATENTS

| Number | Name | Date |
|---|---|---|
| 1,484,853 | Warmisham | Feb. 26, 1924 |
| 1,584,271 | Bertele | May 11, 1926 |
| 1,584,272 | Bertele | May 11, 1926 |
| 1,610,514 | Graf | Dec. 14, 1926 |
| 1,884,994 | Kitroser | Oct. 25, 1932 |
| 1,945,977 | Oswald | Feb. 6, 1934 |
| 2,178,057 | Van Heel | Oct. 31, 1939 |
| 2,356,620 | Schade | Aug. 22, 1944 |
| 2,405,729 | Altman | Aug. 13, 1946 |